(12) United States Patent
Palanisamy et al.

(10) Patent No.: US 10,995,701 B2
(45) Date of Patent: May 4, 2021

(54) TRANSLATING SLEEVE THRUST REVERSER ASSEMBLY

(71) Applicant: ROHR, INC., Chula Vista, CA (US)

(72) Inventors: Jai Ganesh Palanisamy, Bangalore (IN); Boopathy Saravanan, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 16/665,348

(22) Filed: Oct. 28, 2019

(65) Prior Publication Data
US 2021/0071619 A1 Mar. 11, 2021

(30) Foreign Application Priority Data
Sep. 5, 2019 (IN) .............................. 201941035802

(51) Int. Cl.
*F02K 1/72* (2006.01)
*F02K 1/00* (2006.01)
*F02K 1/76* (2006.01)

(52) U.S. Cl.
CPC ............... *F02K 1/72* (2013.01); *F02K 1/008* (2013.01); *F02K 1/766* (2013.01); *F05D 2260/90* (2013.01)

(58) Field of Classification Search
CPC ... F02K 1/09; F02K 1/72; F02K 1/766; F02K 1/70
See application file for complete search history.

(56) References Cited

U.S. PATENT DOCUMENTS

| | | | |
|---|---|---|---|
| 3,391,869 A * | 7/1968 | Glass | F02K 1/08 239/265.19 |
| 3,665,709 A | 5/1972 | Medawar et al. | |
| 6,082,096 A | 7/2000 | Vauchel | |
| 7,874,142 B2 | 1/2011 | Beardsley | |
| 8,109,467 B2 | 2/2012 | Murphy | |
| 8,109,468 B2 | 2/2012 | Andre et al. | |
| 8,677,733 B2 * | 3/2014 | Beardsley | F02K 3/075 60/226.2 |
| 8,904,751 B2 | 12/2014 | Howarth et al. | |
| 9,482,181 B2 * | 11/2016 | Hurlin | F02K 1/72 |
| 9,816,462 B2 * | 11/2017 | Guerin | F02K 1/70 |
| 10,018,151 B2 | 7/2018 | Nakhjavani et al. | |
| 10,221,809 B2 | 3/2019 | Charron et al. | |
| 10,267,262 B2 | 4/2019 | Calder et al. | |
| 10,288,007 B2 | 5/2019 | Kopecek | |
| 10,302,044 B2 * | 5/2019 | Schrell | F02K 3/06 |

(Continued)

FOREIGN PATENT DOCUMENTS

GB 1345337 A * 1/1974 .............. F02K 1/70

OTHER PUBLICATIONS

European Patent Office, European Search Report dated Jul. 10, 2020 in Application No. 19215410.2.

*Primary Examiner* — Gerald L Sung
*Assistant Examiner* — Marc J Amar
(74) *Attorney, Agent, or Firm* — Snell & Wilmer L.L.P.

(57) ABSTRACT

A thrust reverser assembly may comprise a sleeve including an inner sleeve portion and an outer sleeve portion. A plurality of guide rails may be coupled to a radially outward surface of the inner sleeve portion. A plurality of blocker doors may be slidably coupled to the plurality of guide rails. The plurality of blocker doors may be located between the inner sleeve portion and the outer sleeve portion.

20 Claims, 8 Drawing Sheets

(56) References Cited

U.S. PATENT DOCUMENTS

| | | | |
|---|---|---|---|
| 2007/0234707 A1* | 10/2007 | Beardsley | F02K 1/72 60/226.2 |
| 2009/0121078 A1* | 5/2009 | Marche | B64D 33/04 244/11 OB |
| 2009/0321561 A1* | 12/2009 | Andre | F02K 1/72 244/11 OB |
| 2013/0284822 A1 | 10/2013 | Howarth et al. | |
| 2015/0121895 A1* | 5/2015 | Suciu | F02K 1/60 60/796 |
| 2015/0267641 A1 | 9/2015 | Gormley | |
| 2015/0337762 A1* | 11/2015 | Penda | F02K 1/70 415/123 |
| 2016/0025037 A1* | 1/2016 | Teia Dos Santos Mendes Gomes | F01D 9/041 415/1 |
| 2016/0369744 A1* | 12/2016 | Gormley | F02K 1/72 |
| 2017/0175674 A1* | 6/2017 | Schrell | F02K 1/72 |
| 2017/0198658 A1* | 7/2017 | Higgins | B64D 33/04 |
| 2017/0198659 A1 | 7/2017 | Gormley | |
| 2017/0321632 A1* | 11/2017 | Howarth | F02K 1/70 |
| 2017/0370325 A1* | 12/2017 | Fert | F02K 1/70 |
| 2018/0106216 A1* | 4/2018 | Jouvet | F02K 1/763 |
| 2018/0216573 A1* | 8/2018 | Kopecek | F02K 1/62 |
| 2018/0258881 A1 | 9/2018 | Schaefer | |
| 2018/0372024 A1* | 12/2018 | Pautis | F02K 1/763 |
| 2019/0162280 A1* | 5/2019 | Gormley | F02K 1/763 |
| 2020/0003151 A1* | 1/2020 | Carr | F02K 1/763 |
| 2020/0003154 A1* | 1/2020 | Carr | F02K 1/763 |
| 2020/0018258 A1* | 1/2020 | Aziz | F02K 1/763 |

\* cited by examiner

TRANSLATING SLEEVE THRUST REVERSER ASSEMBLY

CROSS REFERENCE TO RELATED APPLICATIONS

This application claims priority to, and the benefit of, Indian Provisional Patent Application No. 201941035802 filed Sep. 5, 2019 and entitled "TRANSLATING SLEEVE THRUST REVERSER ASSEMBLY," which is hereby incorporated by reference in its entirety for all purposes.

FIELD

The present disclosure relates to aircraft nacelles, and, more particularly, to a thrust reverser assembly.

BACKGROUND

A nacelle for a turbine engine typically includes an inlet, a fan cowl, a thrust reverser, and an exhaust section. The nacelle is typically mounted to a wing or a fuselage of an aircraft via a pylon. The thrust reverser may include a cascade of vanes and a translating sleeve. One or more blocker doors may be hinged to an inner sleeve portion of the translating sleeve. The blocker doors may be connected through a drag link coupled to an inner fixed structure (IFS) of the nacelle. The IFS and inner sleeve typically define a bypass flow duct. The drag links and/or blocker doors may be located in the bypass flow duct and can affect the smoothness of flow path surfaces (i.e., the surfaces of the bypass duct), which tends to increase drag and/or noise during operation.

SUMMARY

A thrust reverser assembly is disclosed herein. In accordance with various embodiments, the thrust reverser assembly may comprise a cascade of vanes and a sleeve configured to translate relative to the cascade of vanes. The sleeve may include an inner sleeve portion and an outer sleeve portion. A first track may be coupled to a radially outward surface of the inner sleeve portion. The first track may define a first aperture. A first blocker door may be located between the inner sleeve portion and the outer sleeve portion. The first blocker door may include a first pin located through the first aperture.

In various embodiments, the first blocker door may be pivotably coupled to an aft ring of the cascade of vanes. In various embodiments, the first blocker door includes a first axial end and a second axial end opposite the first axial end. The second axial end may be hingedly coupled to the aft ring of the cascade of vanes, and the first axial end may be configured to translate in a radially inward direction in response to aftward translation of the sleeve.

In various embodiments, a second track may be coupled to the radially outward surface of the inner sleeve portion and may define a second aperture. The second track may be circumferentially adjacent to the first track. A second pin of the first blocker door may be may be located through the second aperture.

In various embodiments, a third track may be coupled to the radially outward surface of the inner sleeve portion. The third track may define a third aperture and may be circumferentially adjacent to the first track. A second blocker door circumferentially adjacent to the first blocker door may be slidably coupled to the third track.

In various embodiments, the first track may be parallel to the second track and non-parallel to the third track. In various embodiments, a circumferential distance between the first track and the third track increases in an aftward direction.

In various embodiments, a plurality of guide rails may be coupled to the radially outward surface of the inner sleeve portion. A first guide rail of the plurality of guide rails may include the first track and the third track. A second guide rail of the plurality of guide rails may include the second track and a fourth track defining a fourth aperture.

A nacelle is also disclosed herein. In accordance with various embodiments, the nacelle may comprise an inner fixed structure and a thrust reverser assembly radially outward of the inner fixed structure. The thrust reverser assembly may comprise a sleeve, a first track, and a first blocker door. The sleeve may be configured to translate relative to the inner fixed structure. The sleeve may include an inner sleeve portion and an outer sleeve portion. The first track may be coupled to a radially outward surface of the inner sleeve portion. The first track may define a first aperture. The first blocker door may be located between the inner sleeve portion and the outer sleeve portion. The first blocker door may include a first pin located through the first aperture.

In various embodiments, the thrust reverser assembly may further comprise a cascade of vanes located between the outer sleeve portion and the inner sleeve portion. The first blocker door may be pivotably coupled to a static structure of the cascade of vanes.

In various embodiments, the thrust reverser assembly may further comprise a second track coupled to the radially outward surface of the inner sleeve portion and circumferentially adjacent to the first track. The second track may define a second aperture. The second blocker door may further include a second pin located through the second aperture.

In various embodiments, the thrust reverser assembly may further comprise a third track coupled to the radially outward surface of the inner sleeve portion. A second blocker door circumferentially adjacent to the first blocker door may be slidably coupled to the third track.

In various embodiments, the second track may be parallel to the first track. In various embodiments, the third track may be non-parallel to the first track.

In various embodiments, the thrust reverser assembly may further comprise a plurality of guide rails coupled to the radially outward surface of the inner sleeve portion. A first guide rail of the plurality of guide rails may include the first track and the third track. A second guide rail of the plurality of guide rails may include the second track and a fourth track.

In various embodiments, the first blocker door may further comprise an oblong shaped slide support located around the first pin. The oblong shaped slide support may define a groove configured to receive the first track.

In accordance with various embodiments, a thrust reverser assembly may comprise a sleeve, a plurality of guide rails, and a plurality of blocker doors. The sleeve may include an inner sleeve portion and an outer sleeve portion. The plurality of guide rails may be coupled to a radially outward surface of the inner sleeve portion. The plurality of blocker doors may be slidably coupled to the plurality of guide rails and located between the inner sleeve portion and the outer sleeve portion.

In various embodiments, a first blocker door of the plurality of blocker doors may be slidably coupled to a first guide rail of the plurality of guide rails and to a second guide rail of the plurality of guide rails.

In various embodiments, a second blocker door of the plurality of blocker doors may be slidably coupled to the first guide rail of the plurality of guide rails and to a third guide rail of the plurality of guide rails.

In various embodiments, the first guide rail may include a first track defining a first aperture. The second guide rail may include a second track defining a second aperture. The second track may be parallel to the first track. The first blocker door may include a first pin located through the first aperture and a second pin located through the third aperture. The first guide rail may further include a third track. The third track may be non-parallel to the first track.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" and "aftward" refer to the direction associated with the tail (i.e., the back end) of an aircraft, or generally, to the direction of exhaust of the gas turbine engine. As used herein, "forward" refers to the direction associated with the nose (i.e., the front end) of an aircraft, or generally, to the direction of flight or motion.

A first component that is "radially outward" of a second component means that the first component is positioned at a greater distance away from a central longitudinal axis of the nacelle than the second component. A first component that is "radially inward" of a second component means that the first component is positioned closer to the central longitudinal axis of the nacelle than the second component.

Figure 1A:
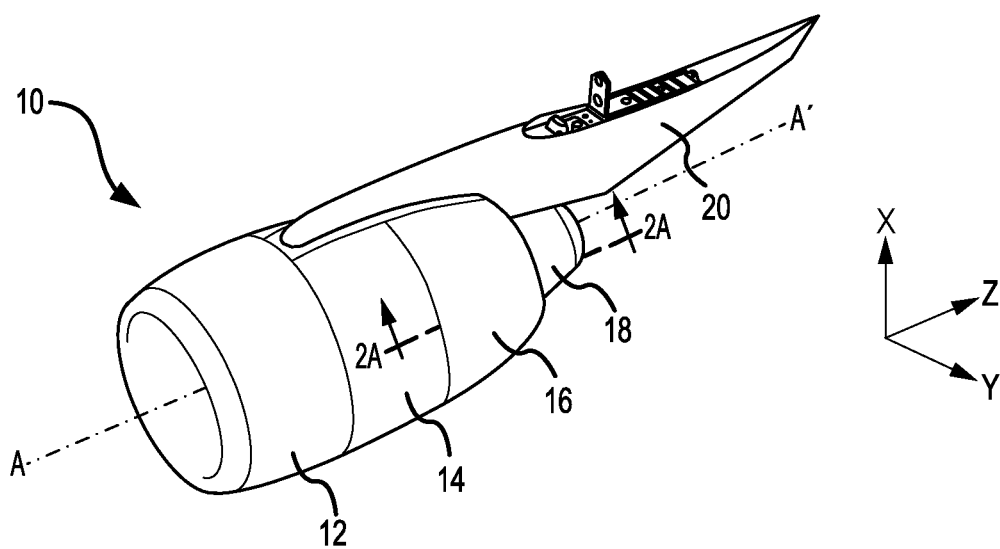
FIG. 1A illustrates a perspective view of a nacelle of a propulsion system, in accordance with various embodiments.

Referring to FIG. 1A, a nacelle 10 for a propulsion system 100 is illustrated, in accordance with various embodiments. Nacelle 10 may comprise an inlet assembly 12, a fan cowl assembly 14, a thrust reverser assembly 16, and an exhaust system 18. In various embodiments, nacelle 10 may include a pylon 20. Pylon 20 may be configured to mount nacelle 10 and an engine surrounded by nacelle 10 to an aircraft structure, such as a wing or aircraft fuselage.

Figure 1B:
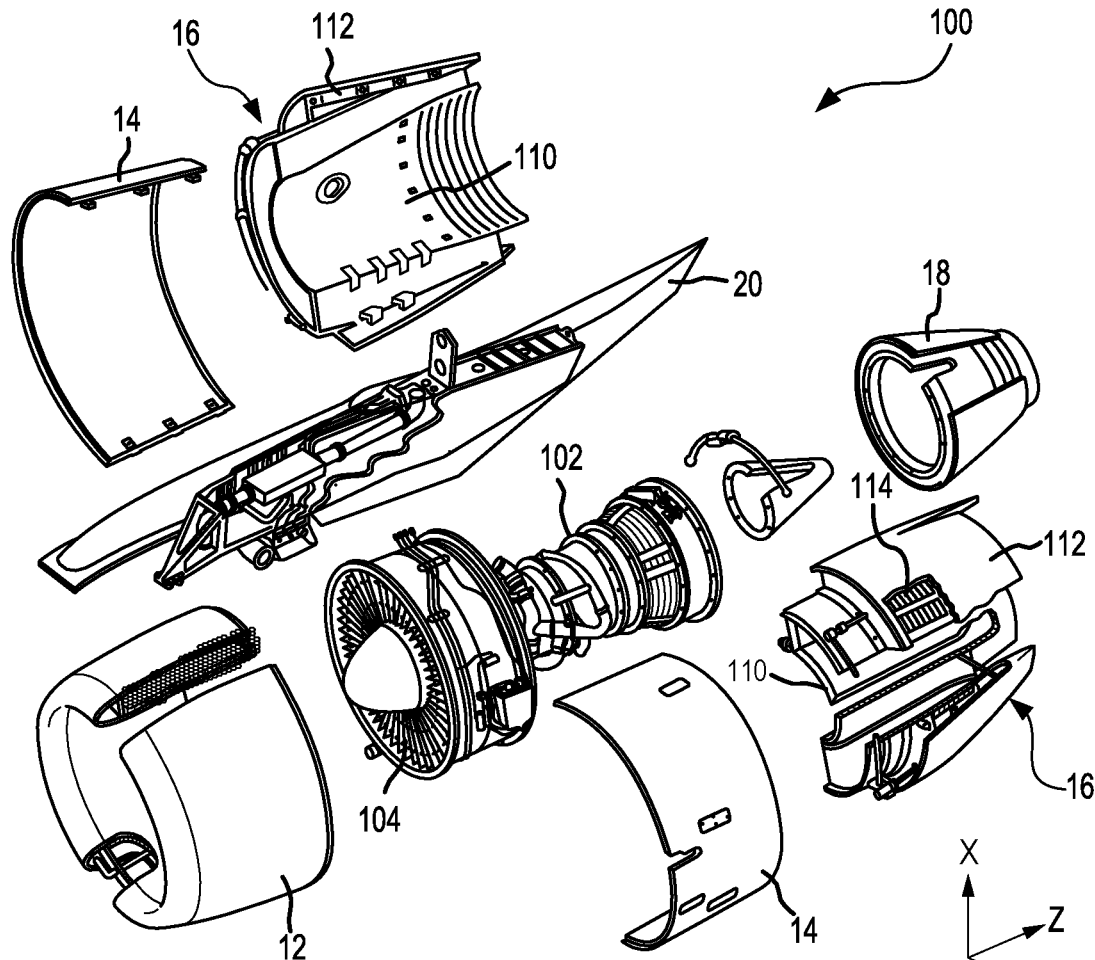
FIG. 1B illustrates an exploded view of a propulsion system, in accordance with various embodiments.

With reference to FIG. 1B, and continuing reference to FIG. 1A, an exploded view of a propulsion system 100 is illustrated. In accordance with various embodiments, propulsion system 100 includes nacelle 10 and a gas turbine engine 102. Gas turbine engine 102 may be surrounded by components of nacelle 10. Nacelle 10 may provide smooth aerodynamic surfaces for airflow around and into gas turbine engine 102. Nacelle 10 may define at least a portion of one or more bypass air duct(s) through propulsion system 100.

In operation, a fan 104 of gas turbine engine 102 draws and directs a flow of air into and through propulsion system 100. The air may be divided into two principal flow paths: a core flow path through the core of gas turbine engine 102, and a bypass flow path through one or more bypass ducts outside of the core of gas turbine engine 102. The air in the core flow path may be directed through a compressor of gas turbine engine 102 that increases the air flow pressure, and then through a combustor of gas turbine engine 102 where the air is mixed with fuel and ignited. The combustion of the fuel and air mixture causes a series of turbine blades aft of the combustor to rotate and drive the rotors of the compressor and the fan of gas turbine engine 102. The exhaust gases are then directed through exhaust system 18.

The air in the bypass flow path may be directed around the engine core through one or more duct(s) defined by nacelle 10. In various embodiments, at least a portion of the bypass flow path is defined by thrust reverser assembly 16 and an inner fixed structure (IFS) 110. For example, thrust reverser assembly 16 may comprise translating sleeve 112. Bypass air output from fan 104 may flow between an exterior (or radially outward) surface of IFS 110 and an interior (or radially inward) surface of translating sleeve 112. In accordance with various embodiments, thrust reverser assembly 16 may include a cascade of vanes 114 (referred to herein as cascade 114). As discussed in further detail below, translating sleeve 112 is configured to translate aftward and expose cascade 114, thereby generating reverse thrust.

Figure 2A:
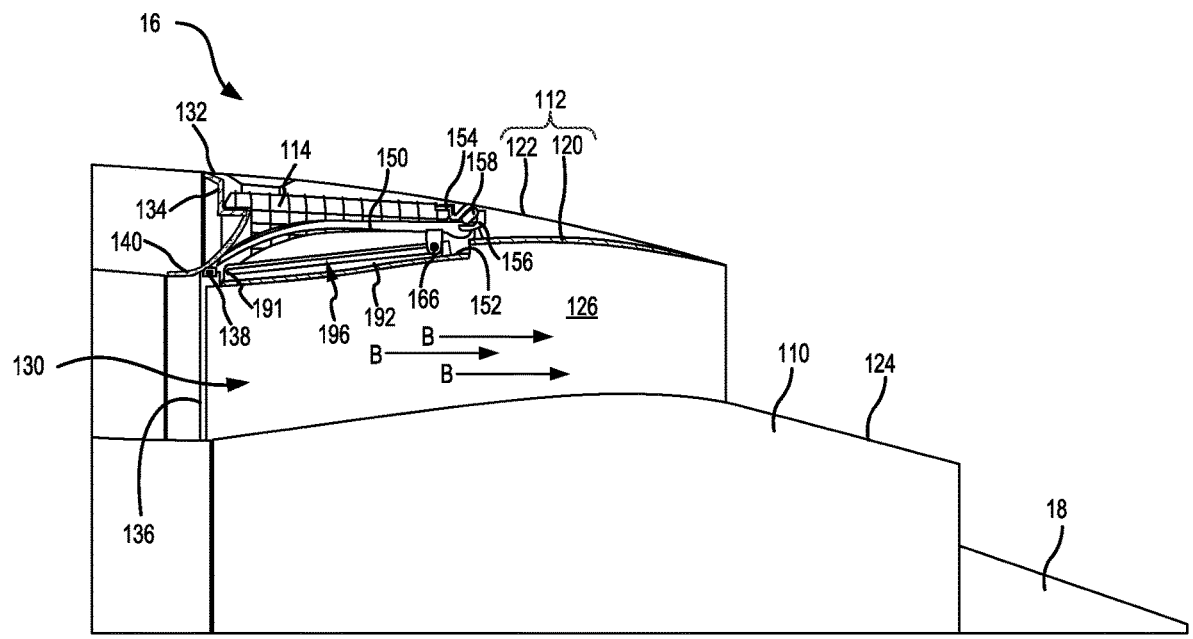
FIG. 2A illustrates a cross-section view, taken along the line 2A-2A in FIG. 1A, of a thrust reverser assembly with the translating sleeve of the thrust reverser assembly in a closed position, in accordance with various embodiments.

With reference to FIG. 2A, a cross-section view of thrust reverser assembly 16 is illustrated with translating sleeve 112 in a closed position. In accordance with various embodiments, translating sleeve 112 includes an inner sleeve portion 120 and an outer sleeve portion 122. A radially outward surface 124 of IFS 110 and a radially inward surface 126 of inner sleeve portion 120 may define, at least, a portion of a bypass flow duct 130 through which bypass air B from fan 104 (FIG. 1B) flows. Cascade 114 is located radially between inner sleeve portion 120 and outer sleeve portion 122.

In the closed position, a forward end 132 of outer sleeve portion 122 is located proximate a forward bulkhead 134. In various embodiments, in the closed position, forward end 132 of outer sleeve portion 122 may form a sealing interface with forward bulkhead 134. In the closed position, a forward end 136 of inner sleeve portion 120 is located proximate a ramp 140. Ramp 140 is located forward of inner sleeve portion 120. In various embodiments, a seal 138 may form a sealing interface between forward end 136 of inner sleeve portion 120 and ramp 140. Ramp 140 may comprise a generally conical or frustoconical shape. Ramp 140 may be configured to direct bypass air B toward cascade 114 during reverse thrust (i.e., when translating sleeve 112 is in an open position). In various embodiments, seal 138 may be coupled to inner sleeve portion 120. In this regard, seal 138 may translate axially via its attachment to inner sleeve portion 120.

In accordance with various embodiments, thrust reverser assembly 16 includes a plurality of blocker doors 150 (one shown) located circumferentially about a central longitudinal axis A-A' of nacelle 10 (with momentary reference to FIG. 1A). During forward thrust conditions, blocker doors 150 are located between inner sleeve portion 120 and outer sleeve portion 122. Stated differently, when translating sleeve 112 is in the closed position (FIG. 2A), blocker doors 150 are in the stowed position. In the stowed position, blocker doors 150 are located radially outward of a radially outward surface 152 of inner sleeve portion 120.

In accordance with various embodiments, blocker doors 150 are pivotably coupled to a static, or fixed, structure in the nacelle, such as, for example, an aft ring 154 of cascade 114. In various embodiments, blocker doors 150 may be hingedly coupled to aft ring 154 at one or more hinge joint(s) 156. Blocker doors 150 may be configured to rotate about hinge joints 156. In various embodiments, a seal 158 may form a sealing interface between blocker doors 150 and aft ring 154. As described in further detail below, a plurality of tracks 192 (one shown) is located circumferentially about radially outward surface 152 of inner sleeve portion 120. Tracks 192 are slidably coupled to blocker doors 150. In various embodiments, a first pin 166 of the blocker door 150 may be located through an aperture 196 defined by the track 192. In accordance with various embodiments, track 192 and first pin 166 tend to facilitate and support axial translation of inner sleeve portion 120 and radial translation (i.e., rotation) of blocker door 150.

Figure 2B:
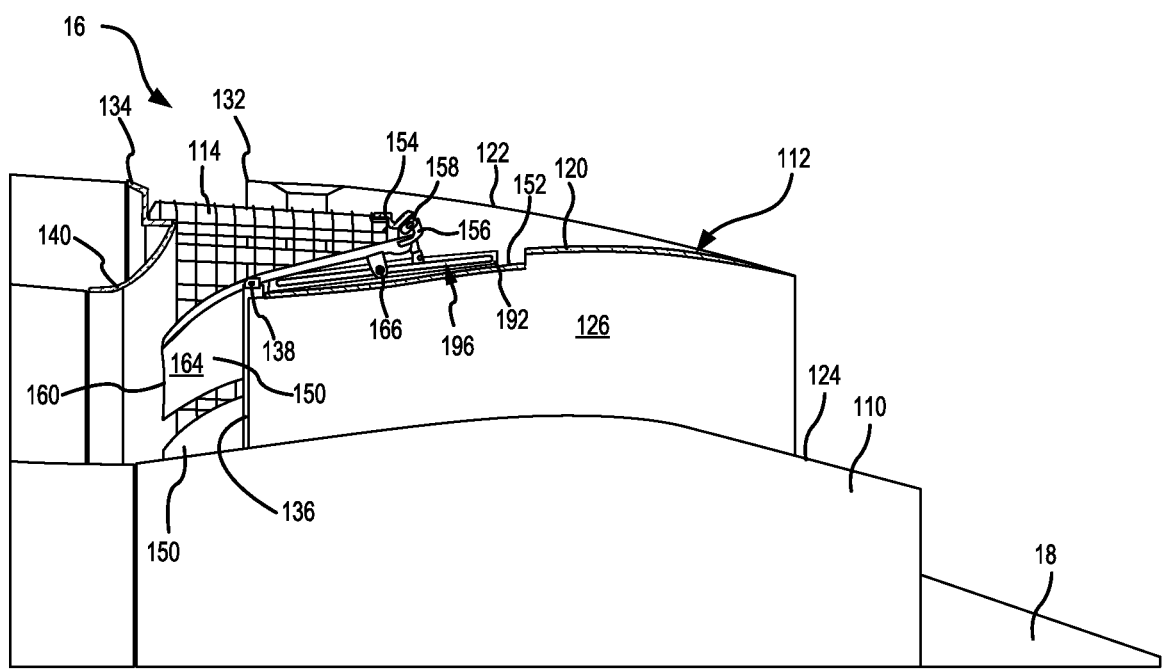
FIG. 2B illustrates a cross-section view of a thrust reverser assembly with the translating sleeve of the thrust reverser assembly in a partially open position, in accordance with various embodiments

Referring to FIG. 2B, a cross-section view of thrust reverser assembly 16 is illustrated with translating sleeve 112 in a partially open position and blocker door 150 in a partially deployed position. In accordance with various embodiments, as translating sleeve 112 translates relative to IFS 110 and cascade 114. As translating sleeve 112 translates aftward, track 192 slides aftward along first pin 166 and blocker door 150 pivots about hinge joint 156. The rotation of blocker door 150 about hinge joint 156 translates a first axial end 160 of blocker door 150 radially inward. In this regard, blocker door 150 is configured such that, as translating sleeve 112 translates aftward, first axial end 160 of blocker door 150 translates in a radially inward direction toward IFS 110. In various embodiments, as blocker door 150 translates in the radially inward direction, seal 138 may form a sealing interface with a radially inward surface 164 of blocker door 150.

Figure 2C:
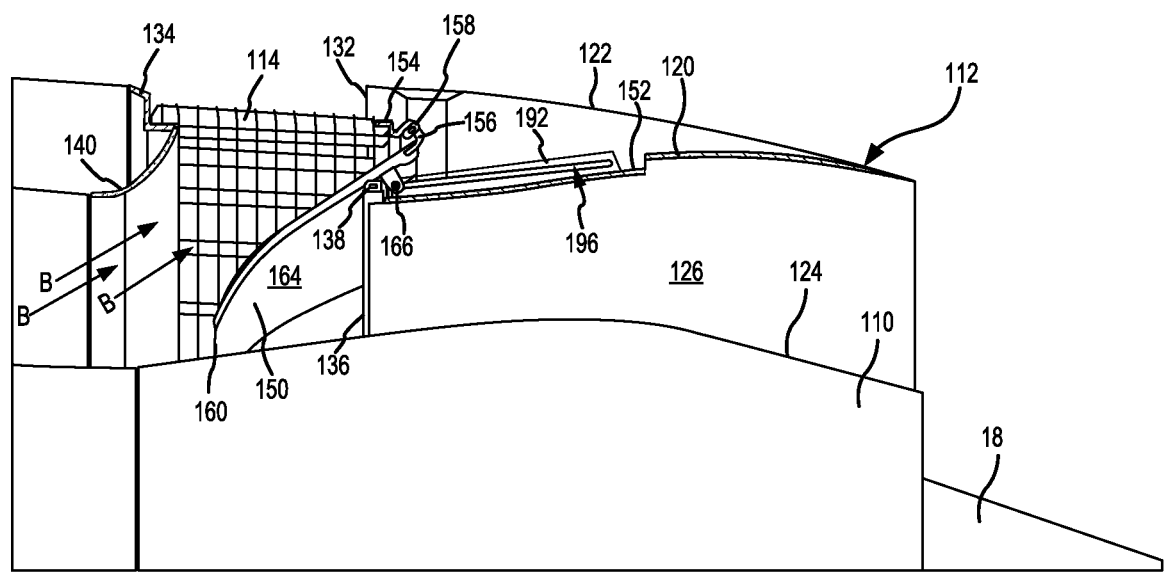
FIG. 2C illustrates a cross-section view of a thrust reverser assembly with the translating sleeve of the thrust reverser assembly in a fully open position, in accordance with various embodiments.

Referring to FIG. 2C, a cross-section view of thrust reverser assembly 16 is illustrated with translating sleeve 112 in the fully open position and with blocker door 150 in the fully deployed position. In accordance with various embodiments, translating sleeve 112 may translate aftward until a surface 191 (FIG. 2A) of track 192 contacts first pin 166. Surface 191 may define a forward end of aperture 196. The interference between surface 191 and first pin 166 tends to prevent or block aftward translation of translating sleeve 112. In the fully open position, first axial end 160 of blocker door 150 is located proximate to radially outward surface 124 of IFS 110. In various embodiments, when translating sleeve 112 is in the fully open position, first axial end 160 of blocker door 150 may contact radially outward surface 124 of IFS 110. In the fully open position, blocker door 150 may direct bypass air B toward cascade 114, thereby generating reverse thrust.

Figure 3:
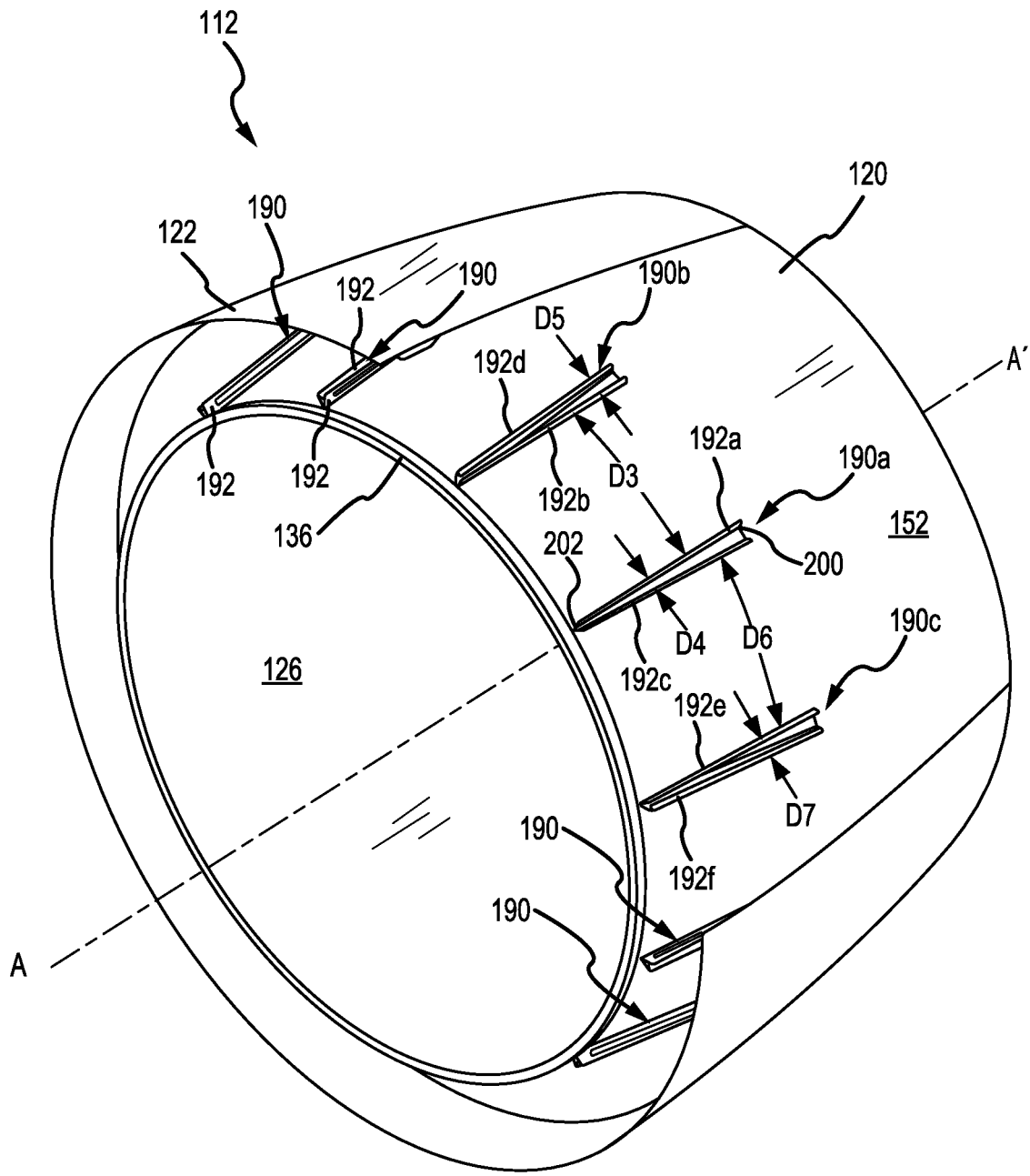
FIG. 3 illustrates a perspective view of a plurality of guide rails attached to an inner sleeve portion of a translating sleeve, in accordance with various embodiments.

With reference to FIG. 3, a perspective view of translating sleeve 112 is illustrated. In FIG. 3 a portion of outer sleeve portion 122 has been removed to better illustrate the features on radially outward surface 152 of inner sleeve portion 120. In accordance with various embodiments, a plurality of tracks 192 may be located circumferentially about radially outward surface 152 of inner sleeve portion 120. Blocker door 150 in FIG. 2A may be slidably coupled to a pair of adjacent tracks 192, such as first track 192a and second track 192b.

In various embodiments, the tracks 192 may be part of a plurality of guide rails 190 located circumferentially about radially outward surface 152 of inner sleeve portion 120. Guide rails 190 may each include a pair of tracks 192. For example, a first guide rail 190a may include first track 192a and a third track 192c. First guide rail 190a may be coupled to radially outward surface 152 of inner sleeve portion 120. A second guide rail 190b may include second track 192b and a fourth track 192d. Second guide rail 190b may be coupled to radially outward surface 152 of inner sleeve portion 120. A third guide rail 190c may include a fifth track 192e and a sixth track 192f. Third guide rail 190c may be coupled to radially outward surface 152 of inner sleeve portion 120. Second guide rail 190b and third guide rail 190c are circumferentially adjacent to first guide rail 190a. Stated differently, first guide rail 190a is located circumferentially between second guide rail 190b and third guide rail 190c.

Figure 4:
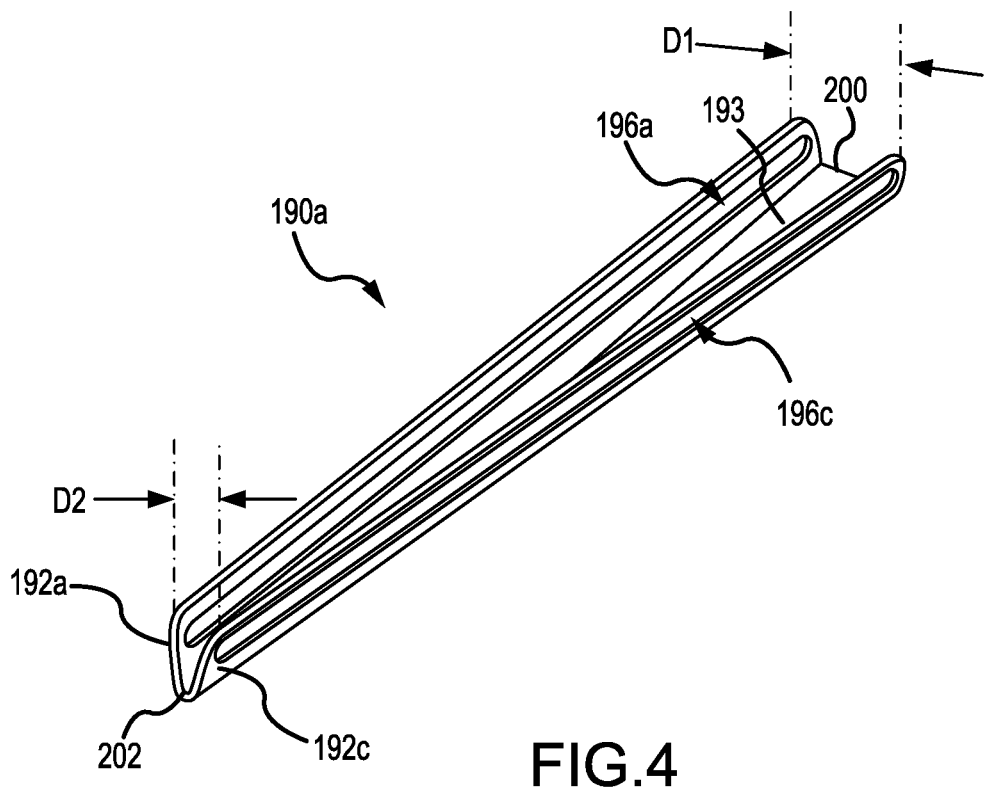
FIG. 4 illustrates a perspective view of a guide rail for a thrust reverser assembly, in accordance with various embodiments.

With reference to FIG. 4, a perspective view of first guide rail 190a is illustrated. In accordance with various embodiments, first guide rail 190a includes first track 192a and third track 192c. First track 192a and third track 192c may extend radially from a floor 193 of first guide rail 190a. In various embodiments, first guide rail 190a is manufactured as a single, monolithic piece. In various embodiments, first track 192a and third track 192c may be manufactured separately and then affixed to floor 193.

In accordance with various embodiments, first track 192a defines a first aperture 196a. Third track 192c defines a third aperture 196c. In various embodiments, third track 192c may be oriented at an angle greater than 0° relative to first track 192a. Stated differently, third track 192c may be non-parallel to first track 192a. Stated yet another way, third track 192c is angled relative to first track 192a such that a circumferential distance D1 between third track 192c and first track 192a, as measured at an aft (or first) end 200 of first guide rail 190a, is greater than a circumferential distance D2 between third track 192c and first track 192a, as measured at a forward (or second) end 202 of first guide rail 190a. In this regard, the distance between third track 192c and first track 192a may increase in an aft direction. While FIG. 4 illustrates first guide rail 190a, it should be understood that second guide rail 190b, third guide rail 190c and/or the other guide rails 190 coupled to inner sleeve portion 120, with momentary reference to FIG. 3, include the elements and functionalities as described herein with respect to first guide rail 190a.

Returning to FIG. 3, guide rails 190, including first guide rail 190a, second guide rail 190b, and third guide rail 190c, are coupled to inner sleeve portion 120 via any suitable attachment technique (e.g., adhesive, rivets, nuts and bolts, etc.). In various embodiments, guide rails 190, including first guide rail 190a, second guide rail 190b, and third guide rail 190c, may be integral (e.g., manufactured as part of) to inner sleeve portion 120. As used herein, "integral" means forming one, single continuous piece. While FIG. 3 illustrates adjacent pairs of the tracks 192 being attached to one another as part of a guide rail 190, it is further contemplated and understood that each track 192 may be discrete from the other tracks 192. For example, first track 192a may be discrete or separate from third track 192c, and second track 192b may be discrete or separate from fourth track 192d, and/or fifth track 192e may be discrete or separate from sixth track 192f. In this regard, each track 192 may be individually coupled to radially outward surface 152 of inner sleeve portion 120. Tracks 192 may also be integrally formed with (e.g., manufactured as part of) inner sleeve portion 120.

Each track 192 is circumferentially adjacent to two tracks 192. For example, first track 192a is circumferentially adjacent to second track 192b and third track 192c. Stated differently, first track 192a is located circumferentially between second track 192b and third track 192c. Second track 192b is circumferentially adjacent to fourth track 192d and first track 192a, with second track 192b being located circumferentially between fourth track 192d and first track 192a. Third track 192c is circumferentially adjacent to first track 192a and fifth track 192e, with third track 192c located circumferentially between fifth track 192e and first track 192a. Fifth track 192e is circumferentially adjacent to sixth track 192f and third track 192c, with fifth track 192e located circumferentially between third track 192c and sixth track 192f.

In various embodiments, each track 192 has one parallel circumferentially adjacent track 192 and one non-parallel circumferentially adjacent track 192. For example, in various embodiments, first track 192a is parallel to second track 192b and non-parallel to third track 192c. In this regard, second track 192b and first track 192a are oriented such that a circumferential distance D3 between second track 192b and first track 192a is constant along the axial lengths of second track 192b and first track 192a (e.g., in the aftward direction), and third track 192c and first track 192a are oriented such that a circumferential distance D4 between third track 192c and first track 192a increases along the axial lengths of third track 192c and first track 192a (e.g., in the aftward direction). Second track 192b is non-parallel to fourth track 192d, with fourth track 192d and second track 192b oriented such that a circumferential distance D5 between fourth track 192d and second track 192b increases along the axial lengths of fourth track 192d and second track 192b (e.g., in the aftward direction). Fifth track 192e is parallel to third track 192c and non-parallel to sixth track 192f. A circumferential distance D6 between third track 192c and fifth track 192e is constant along the axial lengths of third track 192c and fifth track 192e (e.g., in the aftward direction). Fifth track 192e and sixth track 192f are oriented such that a circumferential distance D7 between fifth track 192e and sixth track 192f increases along the axial lengths of fifth track 192e and sixth track 192f (e.g., in the aftward direction). The orientation of tracks 192 allows each blocker door 150 (FIG. 2A) to be coupled to a pair of parallel tracks 192. Coupling blocker doors 150 to parallel tracks 192 tends to facilitate and support the axial translation of inner sleeve portion 120 and the radial translation (i.e., rotation) of blocker doors 150.

Figure 5:
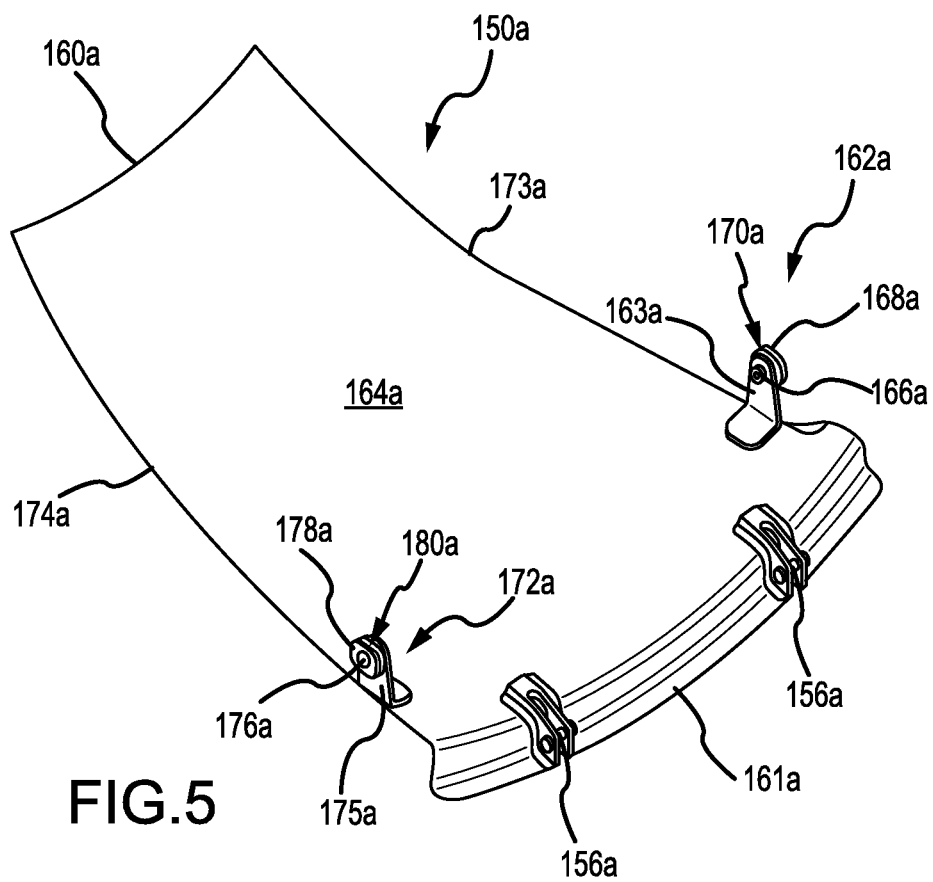
FIG. 5 illustrates a perspective view of a blocker door for a thrust reverser assembly, in accordance with various embodiments.

With reference to FIG. 5, a first blocker door 150a is illustrated. In accordance with various embodiments, hinge joints 156a of first blocker door 150a may be located opposite first axial end 160a of first blocker door 150a. Hinge joints 156a may be located along a second axial end 161a of first blocker door 150a. First blocker door 150a includes a first pin assembly 162a. First pin assembly 162a includes a first flange 163a extending radially inward from radially inward surface 164a of first blocker door 150a. First pin 166a may be coupled to first flange 163a. First pin 166a may extend in a circumferential direction. A first slide support 168a may be coupled to first pin 166a. First slide support 168a may define a first groove 170a. First groove 170a may be configured to receive a track 192 (e.g., first track 192a in FIG. 3).

First blocker door 150a further includes a second pin assembly 172a. First pin assembly 162a may be located at a first circumferential side 173a of first blocker door 150a and second pin assembly 172a may be located at a second circumferential side 174a of first blocker door 150a, opposite the first circumferential side 173a. Second pin assembly 172a includes a second flange 175a extending radially inward from radially inward surface 164a of first blocker door 150a. A second pin 176a may be coupled to second flange 175a. Second pin 176a may extend in a circumferential direction. A second slide support 178a may be coupled to second pin 176a. Second slide support 178a may define a second groove 180a. Second groove 180a may be configured to receive a track 192 (e.g., second track 192b in FIG. 3).

In various embodiments, first and second slide supports 168a, 178a may comprise a generally oblong or oval shape. The oblong or oval shape tends to facilitate the axial translation of inner sleeve portion 120 (FIG. 2B) and the radial translation (i.e., rotation) of blocker doors 150. While first and second slide supports 168a, 178a are illustrated as having a generally oblong or oval shape, it is further contemplated and understood that first and second slide supports 168a, 178a may comprise a circular, rectangular, or any other desired geometric shape. While FIG. 5 illustrates first blocker door 150a, it should be understood that the other blocker doors 150 of thrust reverser assembly 16, including second blocker door 150b, third blocker door 150c, and fourth blocker door 150d, with momentary reference to FIG. 7, may each include the elements and functionalities as described herein with respect to first blocker door 150a.

Figure 6:
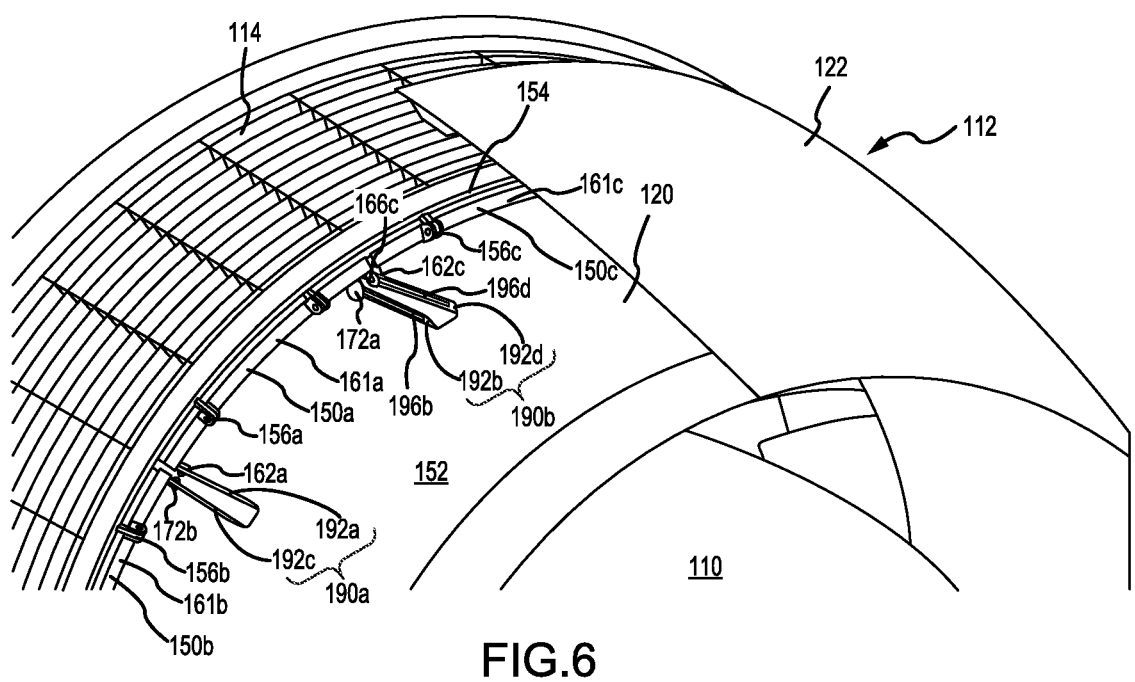
FIG. 6 illustrates a perspective view of a thrust reverser assembly with the translating sleeve of the thrust reverser assembly in the partially open position and the blocker doors of the thrust reverser assembly in a partially deployed position, in accordance with various embodiments.

With reference to FIG. 6, a perspective view of thrust reverser assembly 16 is illustrated with translating sleeve 112 in the partially open position and with the blocker doors (e.g., first blocker door 150a, second blocker door 150b, and third blocker door 150c) in a partially deployed position. In FIG. 6, a portion of outer sleeve portion 122 is removed to illustrate first guide rail 190a and second guide rail 190b. In the partially deployed position shown in FIG. 6, the first axial end 160a (FIG. 5) of first blocker door 150a and the first axial ends of second blocker door 150b and third blocker door 150c are located radially inward of inner sleeve portion 120, such that at least a portion of first blocker door 150a, second blocker door 150b, and third blocker door 150c is located radially between IFS 110 and inner sleeve portion 120.

Figure 7:
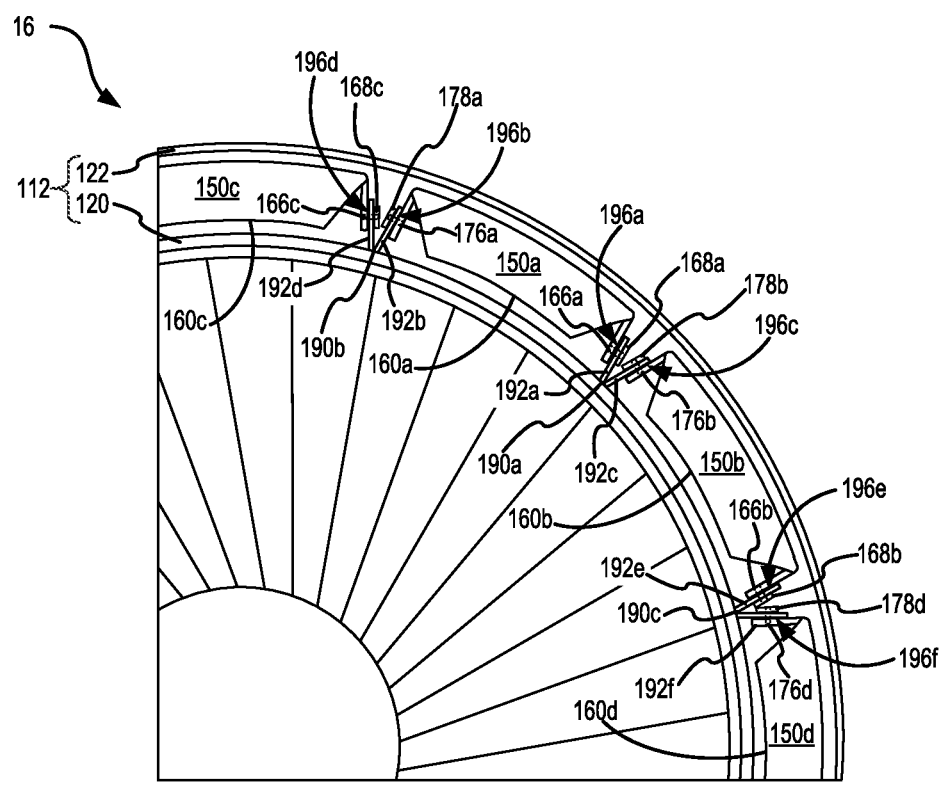
FIG. 7 illustrates an aftward looking view of a thrust reverser assembly with the translating sleeve of the thrust reverser assembly in the closed position and with the blocker doors of the thrust reverser assembly in a stowed position, in accordance with various embodiments.

With reference to FIG. 7, an aftward looking view of thrust reverser assembly 16 is illustrated with translating sleeve 112 in the closed position and the blocker doors (e.g., first blocker door 150a, second blocker door 150b, third blocker door 150c, and fourth blocker door 150d) in the stowed position. In FIG. 7, cascade 114, with momentary reference to FIG. 6, has been removed to more clearly illustrate first blocker door 150a, second blocker door 150b, third blocker door 150c, and fourth blocker door 150d. In the stowed position, the first axial end 160a of first blocker door 150a, first axial end 160b of second blocker door 150b, first axial end 160c of third blocker door 150c, and first axial end 160d of fourth blocker door 150d are each located radially between inner sleeve portion 120 and outer sleeve portion 122.

With combined reference to FIGS. 6 and 7, first blocker door 150a is slidably coupled to first track 192a of first guide rail 190a and second track 192b of second guide rail 190b. Second blocker door 150b is slidably coupled to third track 192c of first guide rail 190a and fifth track 192e of third guide rail 190c. Third blocker door 150c is slidably coupled to fourth track 192d of second guide rail 190b. Fourth blocker door 150d is slidably coupled to sixth track 192f of third guide rail 190c. Second blocker door 150b and third blocker door 150c are circumferentially adjacent to first blocker door 150a. First blocker door 150a is located circumferentially between second blocker door 150b and third blocker door 150c. Fourth blocker door is circumferentially adjacent to second blocker door 150b. Second blocker door 150b is located circumferentially between fourth blocker door 150d and first blocker door 150a.

In various embodiments, first pin assembly 162a of first blocker door 150a is slidably coupled to first track 192a, and second pin assembly 172a of first blocker door 150a is slidably coupled to second track 192b. With combined reference to FIG. 5 and FIG. 6, first pin assembly 162a may be slidably coupled to first track 192a by locating first pin 166a through first aperture 196a (FIG. 4) and locating first track 192a in the first groove 170a defined by first slide support 168a. Second pin assembly 172a of first blocker door 150a may be slidably coupled to second track 192b by locating second pin 176a through second aperture 196b and locating second track 192b in the second groove 180a defined by second slide support 178a. First blocker door 150a is configured to pivot relative to aft ring 154 of cascade 114 via the hinge joints 156a at second axial end 161a of first blocker door 150a.

Returning FIG. 7, in various embodiments, a second pin assembly 172b (FIG. 6) of second blocker door 150b is slidably coupled to third track 192c of first guide rail 190a. A second pin 176b of second blocker door 150b may be located through third aperture 196c of third track 192c, and third track 192c may be located in a groove defined by a second slide support 178b of the second pin assembly 172b on second blocker door 150b. With reference to FIG. 6, second blocker door 150b is configured to pivot relative to aft ring 154 of cascade 114 via hinge joints 156b at second axial end 161b of second blocker door 150b.

In various embodiments, a first pin assembly 162c of third blocker door 150c is slidably coupled to fourth track 192d of second guide rail 190b. A first pin 166c of third blocker door 150c may be located through fourth aperture 196d of fourth track 192d. Fourth track 192d may be located in a groove defined by a first slide support 168c (FIG. 7) of first pin assembly 162c on third blocker door 150c. Third blocker door 150c is configured to pivot relative to aft ring 154 of cascade 114 via hinge joints 156c at second axial end 161c of third blocker door 150c.

Returning to FIG. 7, in various embodiments, a first pin 166b of second blocker door 150b may be located through fifth aperture 196e of fifth track 192e. Fifth track 192e may be located in a groove defined by a first slide support 168b, which may be coupled to first pin 166b of second blocker door 150b. A second pin 176d of fourth blocker door 150d may be located through sixth aperture 196f of sixth track 192f. Sixth track 192f may be located in a groove defined by a second slide support 178d, which may be coupled to second pin 176d of fourth blocker door 150d.

In accordance with various embodiments, first track 192a of first guide rail 190a is configured to be parallel to circumferentially adjacent second track 192b of second guide rail 190b. Third track 192c of first guide rail 190a is configured to be parallel to circumferentially adjacent fifth track 192e of third guide rail 190c.

The configuration of tracks 192 in combination with the first and second pin assemblies (e.g., first pin assembly 162a and second pin assembly 172a) on blocker doors 150 facilitates and supports the axial translation of translating sleeve 112 between the open position and the closed position and the radial translation of blocker doors 150 between the stowed position and the deployed position. The orientation of tracks 192 may be configured such that, when translating sleeve 112 is in the fully open position and blocker doors 150 are in the fully deployed position (FIG. 2C), blocker doors 150 will be located circumferentially closer to one another, as compared to when translating sleeve 112 is in the closed position and blocker doors 150 are in the stowed position (FIG. 2A). Stowing blocker doors 150 between inner sleeve portion 120 and outer sleeve portion 122 tends to reduce drag and or noise of bypass airflow through bypass flow duct 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser assembly, comprising:
   a cascade of vanes;
   a sleeve configured to translate relative to the cascade of vanes, the sleeve including an inner sleeve portion and an outer sleeve portion;
   a first track coupled to a radially outward surface of the inner sleeve portion, the first track defining a first aperture;
   a second track coupled to the radially outward surface of the inner sleeve portion and defining a second aperture, wherein the second track is circumferentially adjacent to the first track, and wherein the first track is parallel to the second track;
   a first blocker door located between the inner sleeve portion and the outer sleeve portion, the first blocker door including a first pin located through the first aperture of the first track and a second pin located through the second aperture, wherein the first blocker door includes a first axial end and a second axial end opposite the first axial end, and wherein the second axial end is hingedly coupled to an aft ring of the cascade of vanes, and wherein the first axial end is configured to translate in a radially inward direction in response to aftward translation of the sleeve;
   a third track coupled to the radially outward surface of the inner sleeve portion, wherein the third track is circumferentially adjacent to the first track and defines a third aperture, and wherein the first track is nonparallel to the third track; and
   a second blocker door circumferentially adjacent to the first blocker door and slidably coupled to the third track.

2. The thrust reverser assembly of claim 1, wherein a circumferential distance between the first track and the third track increases in an aftward direction.

3. The thrust reverser assembly of claim 1, further comprising a plurality of guide rails coupled to the radially outward surface of the inner sleeve portion, wherein a first guide rail of the plurality of guide rails includes the first track and the third track, and wherein a second guide rail of the plurality of guide rails includes the second track and a fourth track defining a fourth aperture.

4. The thrust reverser assembly of claim 1, further comprising:
   a ramp located forward of the inner sleeve portion, wherein the ramp is configured to direct airflow toward the cascade of vanes; and
   a seal configured to form a first sealing interface between the ramp and the inner sleeve portion when the thrust reverser assembly is in a closed position.

5. The thrust reverser assembly of claim 4, wherein the seal is configured to form a second sealing interface with a radially inward surface of the first blocker door in response to the thrust reverser assembly translating to an open position.

6. A nacelle, comprising:
   an inner fixed structure; and
   a thrust reverser assembly radially outward of the inner fixed structure, the thrust reverser assembly comprising:
   a sleeve configured to translate relative to the inner fixed structure, the sleeve including an inner sleeve portion and an outer sleeve portion;
   a first track coupled to a radially outward surface of the inner sleeve portion, the first track defining a first aperture;

a second track coupled to the radially outward surface of the inner sleeve portion and circumferentially adjacent to the first track, the second track defining a second aperture, wherein the second track is parallel to the first track;

a first blocker door located between the inner sleeve portion and the outer sleeve portion, the first blocker door including a first pin located through the first aperture and a second pin located through the second aperture;

a third track coupled to the radially outward surface of the inner sleeve portion, wherein the third track is non-parallel to the first track; and a second blocker door circumferentially adjacent to the first blocker door and slidably coupled to the third track.

7. The nacelle of claim 6, wherein the thrust reverser assembly further comprises a cascade of vanes located between the outer sleeve portion and the inner sleeve portion, and wherein the first blocker door is pivotably coupled to a static structure of the cascade of vanes.

8. The nacelle of claim 6, wherein the thrust reverser assembly further comprises a plurality of guide rails coupled to the radially outward surface of the inner sleeve portion, and wherein a first guide rail of the plurality of guide rails includes the first track and the third track, and wherein a second guide rail of the plurality of guide rails includes the second track and a fourth track.

9. The nacelle of claim 6, wherein the first blocker door further comprises an oblong shaped slide support located around the first pin, and wherein the oblong shaped slide support defines a groove configured to receive the first track.

10. The nacelle of claim 6, wherein a circumferential distance between the first track and the third track increases in an aftward direction.

11. The nacelle of claim 6, wherein the thrust reverser assembly further comprises a seal coupled to the inner sleeve portion and configured to form a sealing interface with a radially inward surface of the first blocker door.

12. A thrust reverser assembly, comprising:
a sleeve including an inner sleeve portion and an outer sleeve portion;
a plurality of guide rails coupled to a radially outward surface of the inner sleeve portion, wherein a first guide rail of the plurality of guide rails includes a first track defining a first aperture, and wherein a second guide rail of the plurality of guide rails includes a second track parallel to the first track and defining a second aperture, and wherein the first guide rail further includes a third track defining a third aperture, the third track being nonparallel to the first track; and a plurality of blocker doors slidably coupled to the plurality of guide rails, wherein the plurality of blocker doors is located between the inner sleeve portion and the outer sleeve portion, wherein a first blocker door of the plurality of blocker doors is slidably coupled to the first track of the first guide rail and to the second track of the second guide rail.

13. The thrust reverser assembly of claim 12, wherein the first blocker door of the plurality of blocker doors is configured to rotate in a radially inward direction in response to aftward translate of the sleeve.

14. The thrust reverser assembly of claim 13, wherein a second blocker door of the plurality of blocker doors is slidably coupled to the third track of the first guide rail and to a third guide rail of the plurality of guide rails.

15. The thrust reverser assembly of claim 12, wherein the first blocker door includes a first pin located through the first aperture and a second pin located through the second aperture.

16. The thrust reverser assembly of claim 12, further comprising:
a seal coupled to the inner sleeve portion of the sleeve; and
a ramp located forward of the inner sleeve portion, wherein the seal is configured to form a first sealing interface with the ramp when the thrust reverser assembly is in a closed position.

17. The thrust reverser assembly of claim 16, wherein the seal is configured to form a second sealing interface with a radially inward surface of the first blocker door in response to the thrust reverser assembly translating to an open position.

18. The thrust reverser assembly of claim 12, further comprising a cascade of vanes located between the outer sleeve portion and the inner sleeve portion, wherein the plurality of blocker doors is hingedly coupled to an aft ring of the cascade of vanes.

19. The thrust reverser assembly of claim 18, further comprising a seal configured to form a sealing interface between the first blocker door and the aft ring of the cascade of vanes.

20. The thrust reverser assembly of claim 12, wherein a circumferential distance between the first track and the third track increases in an aftward direction.

* * * * *